United States Patent
Beckmann et al.

(10) Patent No.: US 7,499,414 B2
(45) Date of Patent: Mar. 3, 2009

(54) METHOD FOR ADMINISTRATION OF A MULTICAST SERVICE

(75) Inventors: Mark Beckmann, Braunschweig (DE); Michael Eckert, Braunschweig (DE); Christina Gessner, München (DE); Thomas Gottschalk, Berlin (DE); Martin Hans, Hildesheim (DE); Norbert Kroth, Potsdam (DE); Dirk Langefeld, Langenfeld (DE); Andreas Otte, Celle (DE); Norbert Schwagmann, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 781 days.

(21) Appl. No.: 10/486,155

(22) PCT Filed: Jul. 30, 2002

(86) PCT No.: PCT/DE02/02805

§ 371 (c)(1),
(2), (4) Date: Feb. 6, 2004

(87) PCT Pub. No.: WO03/017574

PCT Pub. Date: Feb. 27, 2003

(65) Prior Publication Data
US 2004/0180680 A1    Sep. 16, 2004

(30) Foreign Application Priority Data
Aug. 6, 2001 (DE) ................. 101 38 514
Dec. 11, 2001 (DE) ................. 101 60 631

(51) Int. Cl.
*H04Q 11/00* (2006.01)
(52) U.S. Cl. ........................ 370/259; 455/518
(58) Field of Classification Search ............... 370/259, 370/260, 270, 312; 455/412.1, 412.2, 414.2, 455/456.3, 518
See application file for complete search history.

(56) References Cited

U.S. PATENT DOCUMENTS 6,681,114 B2 *  1/2004  Chang et al. ............. 455/456.3

FOREIGN PATENT DOCUMENTS

| EP | 0 828 355 | 3/1998 |
|---|---|---|
| EP | 1 071 296 | 1/2001 |
| EP | 1 213 874 | 5/2002 |
| WO | WO9952304 | 10/1999 |

* cited by examiner

*Primary Examiner*—Lee Nguyen
(74) *Attorney, Agent, or Firm*—Bell, Boyd & Lloyd LLP

(57) ABSTRACT

A method is provided for the administration of a muticast service whereby mobile terminals of users who have subscribed to the multicast service receive multicast messages via a mobile communication network. The present invention seeks to use the available radio resources in a more economical manner. To this end, the mobile terminals are respectively prodied with an input unit which, when actuated, produces activation information which indicates whether the multicast service is activated or deactivated, and the activation information is transmitted to the mobile communication network.

4 Claims, 1 Drawing Sheet

METHOD FOR ADMINISTRATION OF A MULTICAST SERVICE

BACKGROUND OF THE INVENTION

The present invention relates to a method for administering of a multicast service in which mobile terminals whose users have subscribed to the multicast service receive multicast messages via a mobile communications network.

In a multicast service, various subscribers to whom the same multicast message is intended to be transmitted are associated with a multicast group in which the subscribers are included. This multicast group is identified by a multicast address. The message data to be transmitted is sent only once to this multicast address. Ideally, the multicast message is sent only once via common connecting paths from a transmitter for the multicast message to the receivers. The transmitter does not need to know where and how many receivers are concealed behind the multicast address.

In known multicast services, it has been found to be disadvantageous that, irrespective of whether a specific mobile terminal which belongs to a relevant multicast group, is intended to receive multicast messages on the basis of the wishes of the user, multicast messages are sent to all the mobile radio cells in which mobile terminals which belong to that multicast group are located. As such, the transmission of a multicast message frequently makes use of radio resources which are associated with a mobile terminal which, on the basis of the wishes of its user, should not receive any multicast messages at that time.

Against this background, the present invention is directed toward a method for administering of a multicast service in which the available radio resources are used more economically.

SUMMARY OF THE INVENTION

For a method of the type mentioned initially, this is achieved by the present invention in that the mobile terminals are each equipped with an input device whose operation results in the production of activation information which indicates whether the multicast service activated or is deactivated, and the activation information is transmitted to the mobile communications network.

The production of the information that the multicast service is deactivated at times satisfies the preconditions for allowing the mobile communications network to which the information is transmitted to make better decisions on the use of its radio resources. It always has information on the multicast service that is currently activated for each mobile terminal.

The mobile communications network preferably transmits the message for the multicast service only to those mobile terminals for which the deactivation information is not present. This efficiently saves radio resources.

The multicast service may be subdivided into two or more service elements, with the input device then allowing deactivation of each individual service element. The input device may, of course, also be used for reactivation of an individual service element, or all the service elements.

The activation information is, in particular, preferably stored in the form of a table in the mobile terminal and in the mobile communications network, which table contains an entry for each service element as to whether that service element is activated or deactivated.

This table may exist in a continuously updated form in the mobile communications network, with terminals which are involved with the multicast service updating their respective tables in the course of signaling connections by appropriate information signal transmission to the mobile communications network.

Additional features and advantages of the present invention are described in, and will be apparent from, the following Detailed Description of the Invention and the Figures.

DETAILED DESCRIPTION OF THE INVENTION

Figure 1:
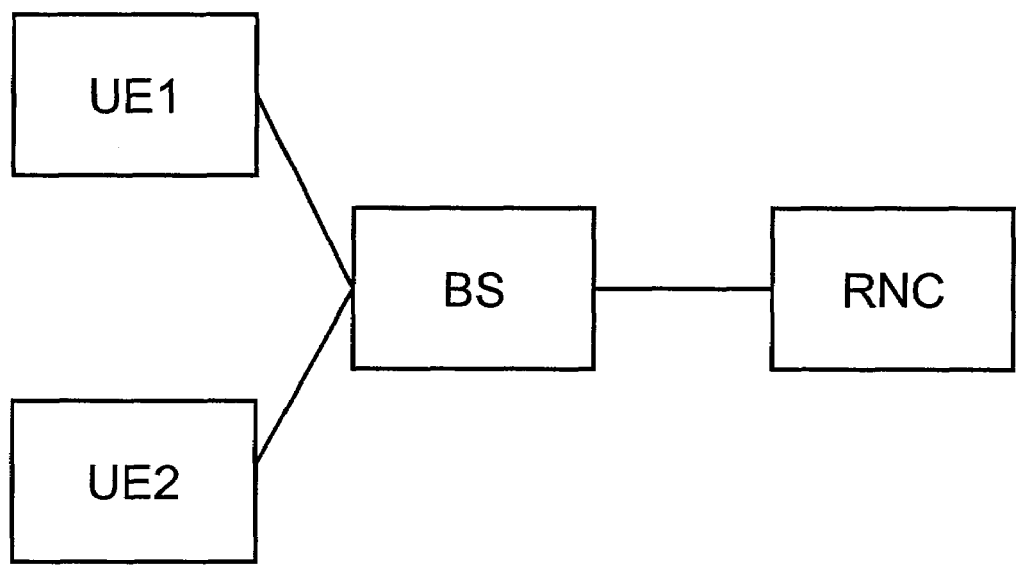
FIG. 1 shows a blocked diagram illustrating the signaling connections between a node in a mobile communications network, a base station and associated mobile terminals in connection with the teachings of the present invention.

It is assumed that two mobile radio stations, E1, UE2 are located in a mobile radio cell Z which is covered by a base station BS which is connected via a landline connection to a node of a mobile communications network RNC. Both the mobile terminals UE1, UE2 and the node of the mobile communications network RNC operate in accordance with UMTS protocol architecture protocols. Within this architecture, so-called RRC states, in particular, are defined, which make statements relating to the signaling state in which a mobile terminal is located with the node in the mobile communications network RNC.

Initially, both mobile terminals UE1 and UE2 are assumed to be in an "idle mode," in which the mobile terminals UE1, UE2 receive "broadcast" messages from the node in the mobile communications network RNC and monitor notification channels (PICH, PCH). The node in the mobile communications network RNC has no knowledge about the mobile terminals UE1, UE2 themselves, nor about whether these mobile terminals UE1, UE2 are located in a cell which is controlled by it.

The users of UE1 and UE2 have both subscribed to the multicast service A, B and C and belong to associated multicast groups MA, MB, MC.

It is also assumed that the mobile terminal UE1 changes from the RRC state "idle mode" to the RRC state "CELL_DCH" because, for example, it has received a call. For this purpose, the mobile terminal UE1 is notified that a call has arrived. The mobile terminal UE1 then sets up a signaling connection to the node in the mobile communications network RNC, in which the mobile terminal UE1 sends an "RRC Connection Request" message to the node in the mobile communications network RNC. The node in the mobile communications network RNC then sends an "RRC Connection Set Up" message back to the mobile terminal UE1. The mobile terminal UE1 configures its protocol layers and sends an "RRC Connection Set Up Complete" message back to the node in the mobile communications network RNC in order to confirm that the signaling connection has been set up.

By way of example, a table now can be sent to the node in the mobile communications network RNC, where it is stored, in the "RRC Connection Set Up Complete" message to the node in the mobile communications network RNC. In the table, each multicast service A, B, C has an associated piece of information which indicates whether the respective multicast service is activated or deactivated. In the event of deactivation, no multicast messages should be sent to that particular mobile terminal UE1, UE2.

Entries can be made in the table via keypads as input devices on the mobile terminals UE1, UE2.

When a transmission of a multicast message now appears for the multicast group Ma, the node in the mobile communications network RNC has to find out where the mobile terminals in the relevant multicast group are located. Since fees also have to be charged for use of the multicast service A, B and C, the node in the mobile communications network RNC also must have information as to which users have activated a respective multicast service A, B and C and wish to receive it.

For this purpose, the node in the mobile communications network RNC carries out a check for the mobile terminals UE1, UE2 which it controls to determine whether the multicast group MA is marked as being activated for them, in their associated table.

Furthermore, the node in the mobile communications network RNC notifies the mobile terminal UE2 that a multicast transmission of a message has arrived for the multicast group MA. The mobile terminal UE2 now checks its table to determine whether its user has activated the multicast group MA. Since this is assumed to be the case in the present exemplary embodiment, the mobile terminal UE2 then sets up a signaling connection via the base station BS to the node in the mobile communications network RNC, and likewise uses an "RRC Connection Set Up Complete" message to transmit its current table to the node in the mobile communications network RNC.

The node in the mobile communications network RNC now has the information that the two mobile terminals UE1, UE2 wish to receive the data in the message for the multicast group MA, and distributes the available radio resources in an appropriate manner. The message is not transmitted to further mobile terminals in the multicast group MA for which one or more of the multicast services is or are deactivated.

It should be stressed that the updating of the tables in the node in the mobile communications network RNC may be carried out in such a way as to ensure reliable updating. Any signaling connections which occur regularly between the mobile terminal UE1, UE2 and the node in the mobile communications network RNC may be used for this purpose. The transmission of a table relating to activation/deactivation of the multicast services A, B, C may also be carried out only when the mobile terminals UE1, UE2 receive a notification that a multicast message has arrived which is intended for the multicast group A to which they belong.

Indeed, although the present invention has been described with reference to the specific embodiments, those of skill in art will recognize that changes may be made thereto without departing from the spirit and scope of the present invention as set for in the hereafter appended claims.

The invention claimed is:

1. A method for administering a multicast service, the method comprising the steps of:
   transmitting a notification to at least one subscriber of the multicast service, that a multicast message is ready for transmission over a mobile communication network;
   receiving, from the at least one subscriber, deactivation/activation information in response to the notification, wherein the information indicates whether one or more multicast services are one of activated and deactivated with respect to the multicast message; and
   transmitting the multicast message to the at least one subscriber if the deactivation/activation information indicates the one or more services are activated for receipt of the message.

2. The method for administering a multicast service as claimed in claim 1, wherein the multicast message is not transmitted if the deactivation/activation information indicates the one or more services are deactivated for receipt of the message.

3. The method for administering a multicast service as claimed in claim 1, wherein the multicast service is subdivided into at least two service elements, wherein the deactivation/activation information indicates if each service element is one of activated and deactivated.

4. The method for administering a multicast service as claimed in claim 3, wherein the deactivation/activation information is received as a table from the at least one subscriber, and wherein the table contains an entry for each service element as to whether the respective service element is respectively deactivated/activated.

* * * * *

UNITED STATES PATENT AND TRADEMARK OFFICE
CERTIFICATE OF CORRECTION

| | | |
|---|---|---|
| PATENT NO. | : 7,499,414 B2 | Page 1 of 1 |
| APPLICATION NO. | : 10/486155 | |
| DATED | : March 3, 2009 | |
| INVENTOR(S) | : Mark Beckmann et al. | |

It is certified that error appears in the above-identified patent and that said Letters Patent is hereby corrected as shown below:

Title page,
Block (54) Title, "Method for Administration of a Multicast Service" should read
-- METHOD FOR THE ADMINISTRATION OF A MULTICAST SERVICE --.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,499,414 B2
APPLICATION NO. : 10/486155
DATED : March 3, 2009
INVENTOR(S) : Mark Beckmann et al.

It is certified that error appears in the above-identified patent and that said Letters Patent is hereby corrected as shown below:

Title page,
Item (54) and Column 1, lines 1 and 2, Title, "Method for Administration of a Multicast Service" should read -- METHOD FOR THE ADMINISTRATION OF A MULTICAST SERVICE --.

This certificate supersedes the Certificate of Correction issued September 1, 2009.

Signed and Sealed this

Twenty-second Day of September, 2009

David J. Kappos
*Director of the United States Patent and Trademark Office*